(No Model.)
D. EVANS.
BORING TOOL FOR LATHES.
No. 332,065. Patented Dec. 8, 1885.
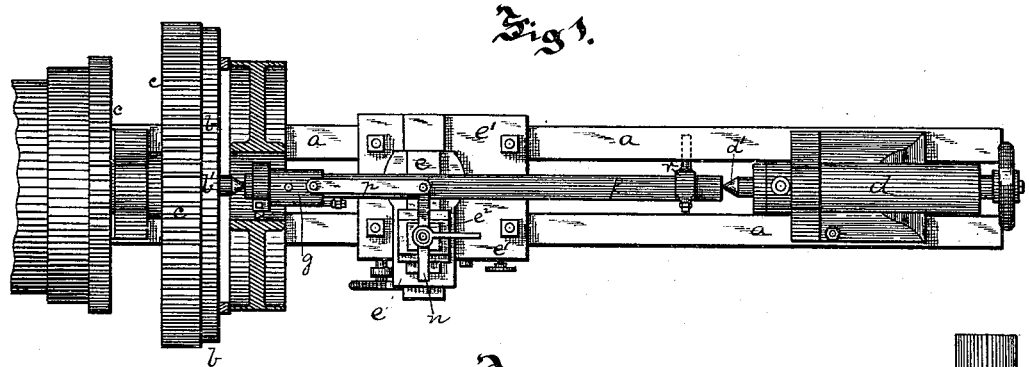
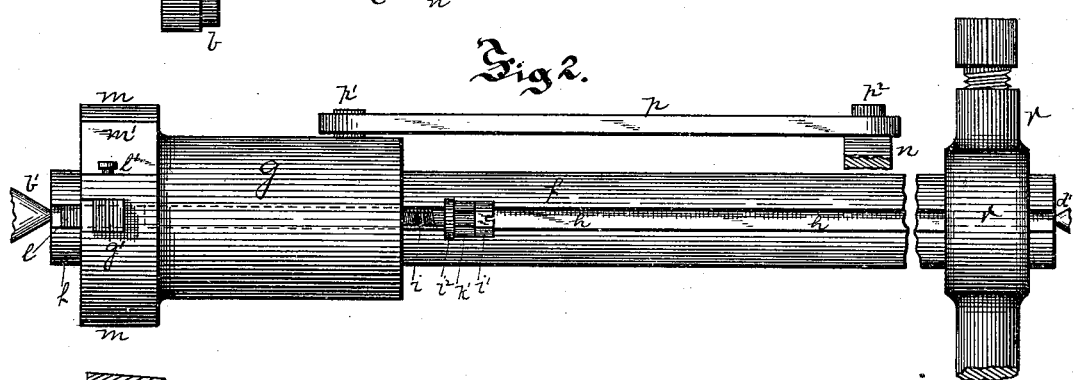
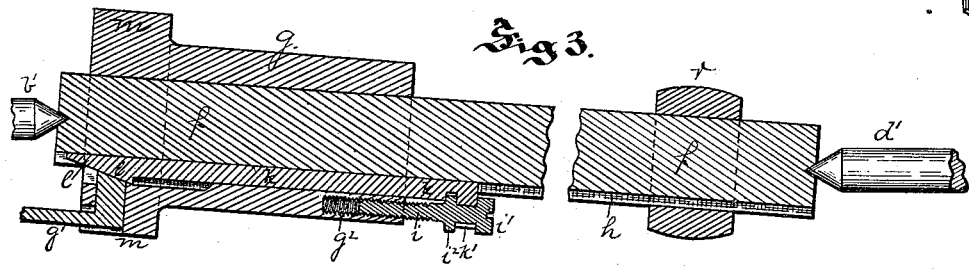
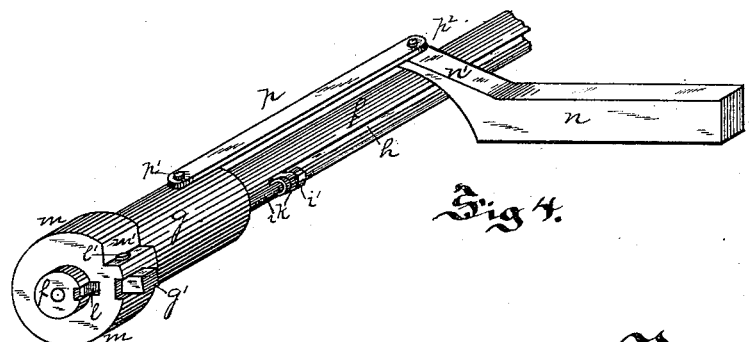
Witnesses.
J. E. Barnes.
J. W. Cooke.
Inventor.
David Evans
By James T. Ray
Attorney

UNITED STATES PATENT OFFICE.

DAVID EVANS, OF SHARPSBURG, PENNSYLVANIA.

BORING-TOOL FOR LATHES.

SPECIFICATION forming part of Letters Patent No. 332,065, dated December 8, 1885.

Application filed February 24, 1885. Serial No. 156,805. (No model.)

*To all whom it may concern:*

Be it known that I, DAVID EVANS, of Sharpsburg, in the county of Allegheny and State of Pennsylvania, have invented a new and useful Improvement in Boring Tools for Engine-Lathes; and I do hereby declare the following to be a full, clear, and exact description thereof.

My invention relates to certain improvements in connection with tools for boring out pulleys, wheels, and other articles, when secured by bolts or chucks to the face-plate or chuck-plate of the ordinary engine-lathe, and has special reference to certain improvements in that class of tools in which the tool-head slides on a shaft supported by the centers of the lathe.

The improvements will be hereinafter specifically set forth.

In the accompanying drawings, forming part of this specification, Figure 1 is a top or plan view of a part of the engine-lathe, showing the means of employing my attachment, and showing in section a pulley secured to the face-plate. Fig. 2 is a side view of my improved boring-tool. Fig. 3 is a longitudinal horizontal central section thereof, and Fig. 4 is a perspective view thereof.

Like letters of reference indicate like parts in each.

The form of engine-lathe with which my boring-tool is employed is not particular, as any of the approved forms or constructions now in common use may be employed for the purpose. The lathe illustrated in the drawings has the lathe-bed $a$, the face or chuck plate $b$, the operative gearing $c$ at one end thereof, the tail-stock $d$ at the other end thereof, and the slide-rest $e$, moving on the slide-rest carriage $e'$, these parts being of any suitable construction. Extending out from the face-plate $b$ is the live-center $b'$, and extending out from the tail-stock $d$ is the dead-center $d'$.

My improved boring-tool is formed of the centering-shaft $f$, which is centered in the lathe between the live-center $b'$ and dead-center $d'$ in the ordinary manner in which a bar or shaft is secured within the lathe, and the tool-head $g$, which slides on the centering-shaft and carries the boring or facing tool $g'$, together with suitable means for imparting the longitudinal movement of the tool-head on the centering-shaft, and feeding out the boring or facing tool. Extending along the side of the centering-shaft $f$ is the slot or keyway $h$, and fitting into this slot or keyway and into the corresponding slot or keyway in the tool-head, is the feeding-bar $k$, which acts the double purpose of a key between the tool-head and the centering-shaft and of a feeding-bar to operate the boring-tool $g'$, one end of the feeding-bar having a beveled face, $l$, against which the boring-tool $g'$ presses, so that when the feeding-bar is moved longitudinally in the slot or keyway it either raises the boring-tool or permits it to be lowered according to the desired adjustment thereof. The boring-tool, after its adjustment to the proper height, is held in place by the set-screw $l'$, which locks it in the desired position for use.

Longitudinal movement for adjusting the boring-tool can be imparted to the feeding-bar in any desired manner, that shown in the drawings being a very simple means for the purpose, and having the advantage that it occupies but little space and can be operated by the machinist by a light wrench, thereby enabling him to obtain an exceedingly fine adjustment of the boring-tool. At the end of the feeding-bar $k$ is the yoke $k'$, which fits between the angular head $i'$ and the collar $i^2$ of the screw $i$, this screw entering into the threaded hole $g^2$ within the tool-head, and by means of a screw-driver or small wrench the feeding-bar $k$ may be moved longitudinally, and thus force out the boring-tool $g'$, or permit it to be pressed farther into the tool-head. The tool-head $g$ is generally made with an enlargement, $m$, at the forward end to receive and support the boring-tool $g'$, while the body of the tool-head is smaller, so as to permit the tool-head to enter within the bore of the pulley, wheel, &c., when the tool is boring at an angle, and in the enlargement $m$ is the recess $m'$ for the reception of the head of the set-screw $l'$, so that the set-screw does not extend out beyond the enlargement of the head.

In adjusting the boring-tool, the set-screw is loosened, the feeding-bar moved longitudinally to adjust the boring-tool to the proper height for boring, and the boring-tool is then locked in place by the set-screw, being thus held firmly in place both by the feeding-bar and by the set-screw. The tool-head is fed forward and back on the centering-shaft $f$ by means of the slide-rest $e$, the slide-rest having connected thereto the bar $n$, provided at its forward end with the extension $n'$, and the bar $n$ and tool-head being connected by a link-rod, $p$, fitting over pins $p'\ p^2$ on the tool-head and the bar $n$. The bar $n$ is connected to the slide-rest in the ordinary tool-holder, $e^2$, formed thereon for the reception of the ordinary tools used therewith. As the slide-rest is fed forward automatically by the ordinary screw-feed employed on these engine-lathes, it feeds forward the tool-head $g$ through the bar $n$ and the link-rod $p$, thus operating the boring-tool, and it is evident that the same gradual feed can be obtained even when the centering-shaft $f$ is arranged at an angle to the center line of the lathe for the purpose of boring a tapering or flaring hole or bore in the wheel or other article secured to the face-plate, the link-rod swinging on the pivot-pins $p'\ p^2$, and thus enabling the slide-rest to feed forward the boring-tool on a line different from the feed of the slide-rest. The centering-shaft is prevented from turning by means of the ordinary dog, $r$, secured thereto and pressing against the lathe-bed $a$, as illustrated in Fig. 1.

When my improved boring-tool is employed, the wheel or other article to be bored out is secured to the face-plate or chuck-plate in the ordinary manner. The centering-shaft $f$, carrying the tool-head $g$, is then centered between the live-center $b'$ and dead-center $d'$, the dog $r$ rigidly secured to the centering-shaft in such position as to press against the body of the lathe-bed and prevent the turning of said lathe-shaft, and the bar $n$ secured in the slide-rest and connected to the tool-head by the link-rod $p$. The proper boring-tool $g'$ is then placed in the tool-head, adjusted to the proper height and locked in place, and the engine set in motion, when the tool-head will be fed forward on the centering-shaft $f$ and bore out the article secured to the face-plate. As soon as it reaches the end of its stroke, the lathe-rest is drawn back by the machinist, the boring-tool advanced the proper distance, and the operation repeated until the boring is completed. As the boring-tool is supported on the centers of the lathe, it is evident that all liability of the boring-tool springing out of true line is entirely overcome, and that the operation of boring is entirely at the command of the machinist.

The tool is simple in construction, and not liable to get out of order, and can be employed on any ordinary engine-lathe now in use.

Where it is desired to bore out a hole smaller than the enlargement of the tool-head, a boring-tool which extends out beyond the tool-head, as illustrated in Fig. 3, may be employed for the purpose, and in this case, as the boring-tool is supported close to the work to be done, it is evident that there will be practically no spring therein. Where it is desired to bore out a tapering or flaring hole, all that is necessary is to move the tail-stock across the lathe-bed, thus drawing the dead-center to one side of the live-center, as illustrated in Fig. 3, when the boring-tool will be supported by said center at the angle at which the hole is required to be bored, and the tool will then operate to bore this tapering or flaring hole. Even though the slide-rest is fed forward longitudinally in its ordinary course, the link-bar will swing on its pivot-points and cause the slide-rest to feed forward the screw-head at the desired angle.

The tail-stocks of these engines are generally constructed to allow of this adjustment across the lathe-bed.

What I claim as my invention, and desire to secure by Letters Patent, is—

1. In combination with an engine-lathe, the centering-shaft adapted to be supported by the centers of the lathe, the tool-head keyed to and sliding on said centering-shaft, the boring-tool $g'$, the feeding-bar $k$, having the beveled face $l'$, and means for adjusting the feeding-bar longitudinally, substantially as and for the purposes set forth.

2. In combination with an engine-lathe, the centering-shaft $f$, adapted to be supported by the centers of the lathe, the tool-head $g$, keyed to and sliding on said shaft, the bar $n$, secured to the slide-rest, and the link-rod $p$, pivoted to the tool-head $g$ and bar $n$, substantially as and for the purposes set forth.

In testimony whereof I, the said DAVID EVANS, have hereunto set my hand.

DAVID EVANS.

Witnesses:
JAMES I. KAY,
J. N. COOKE.